May 1, 1934. H. A. KNOX 1,956,580
FLEXIBLE TRACK
Filed Sept. 3, 1931    3 Sheets-Sheet 1
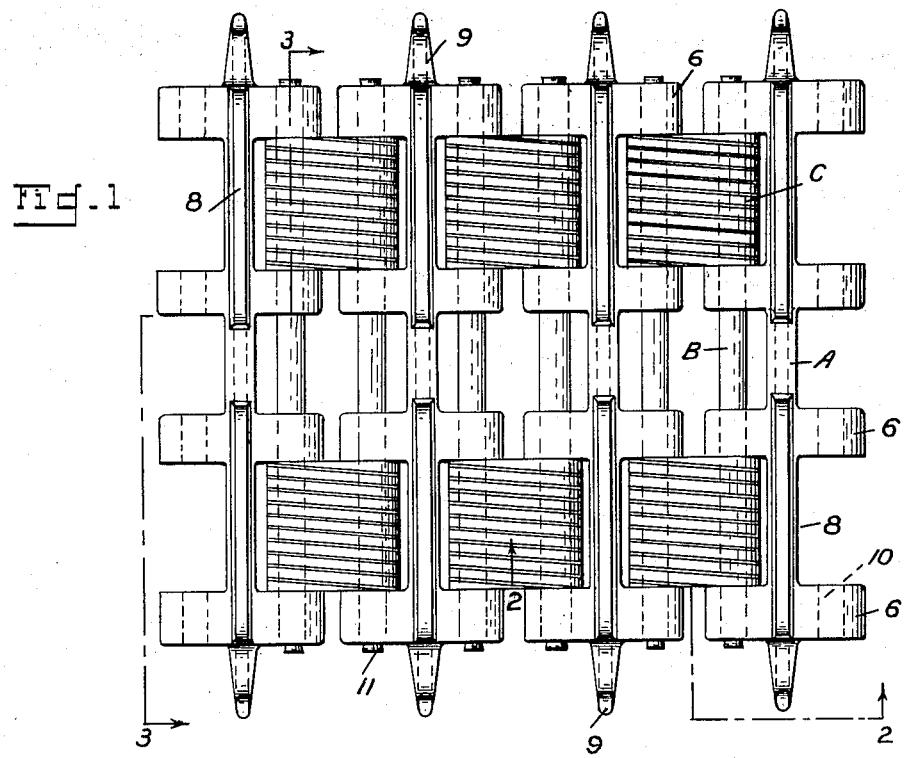
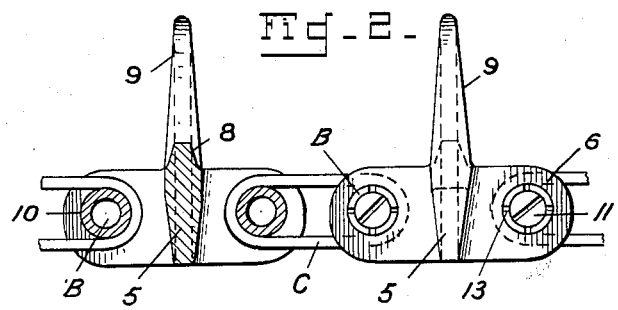
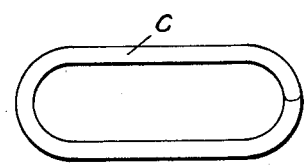
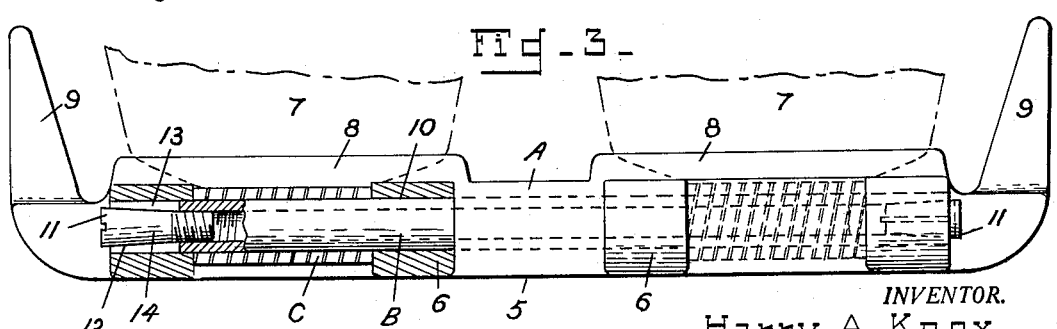
INVENTOR.
Harry A. Knox
BY W. N. Roach
ATTORNEY

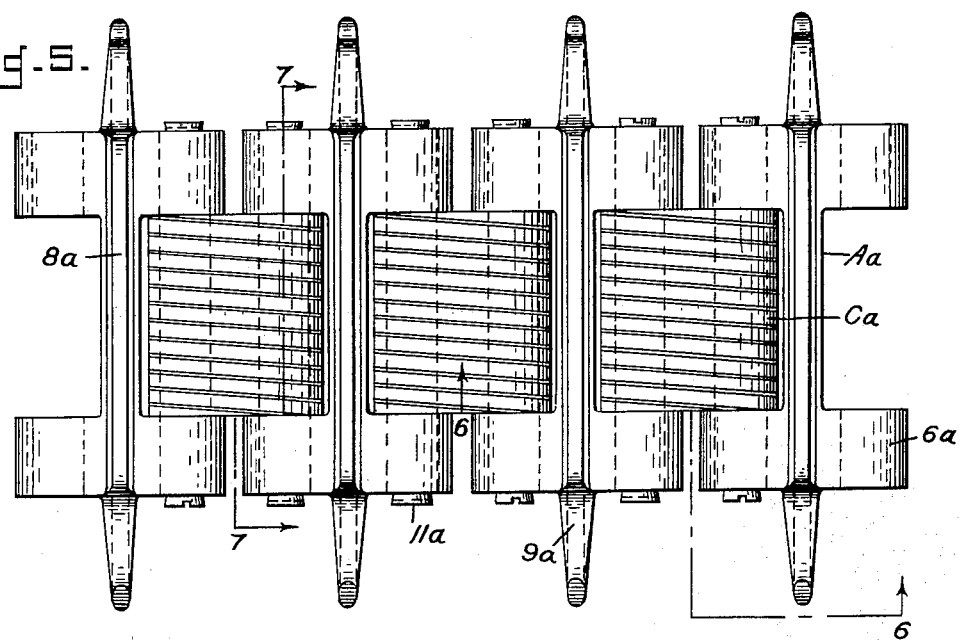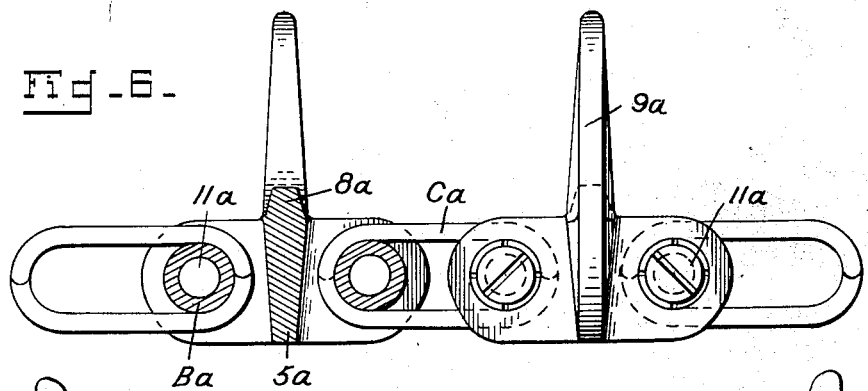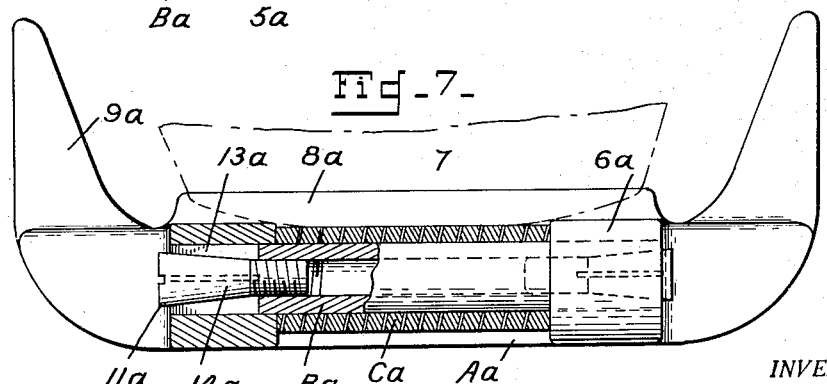

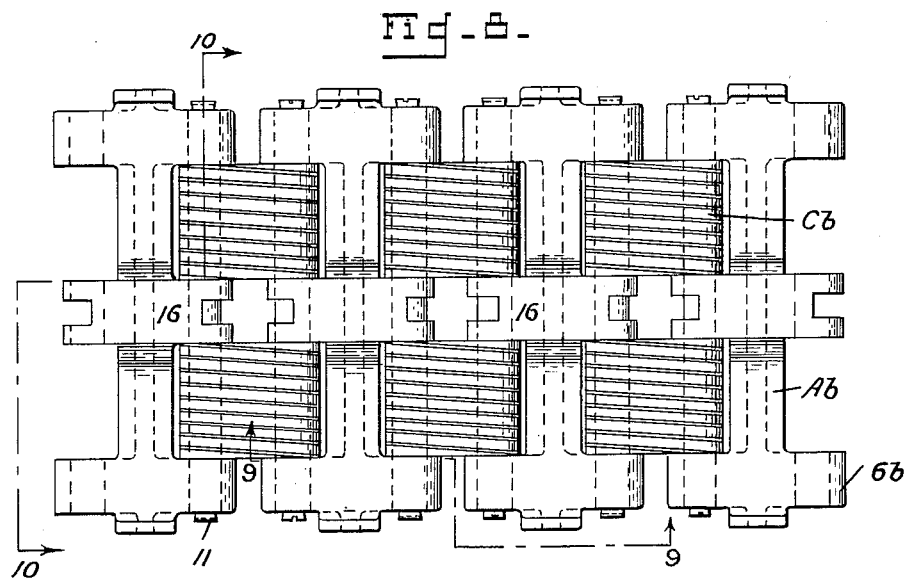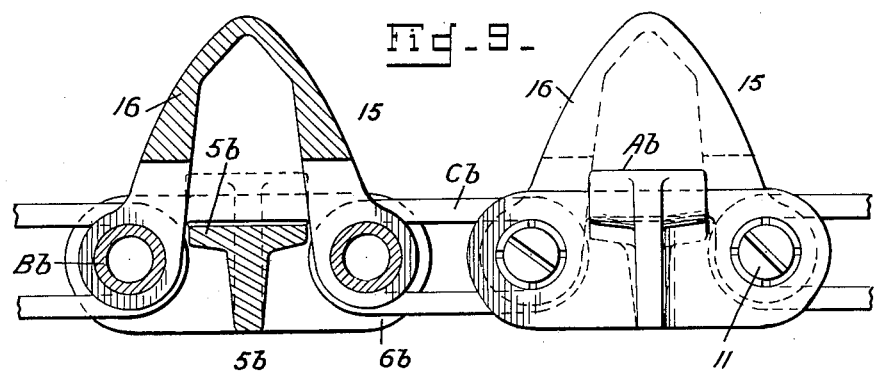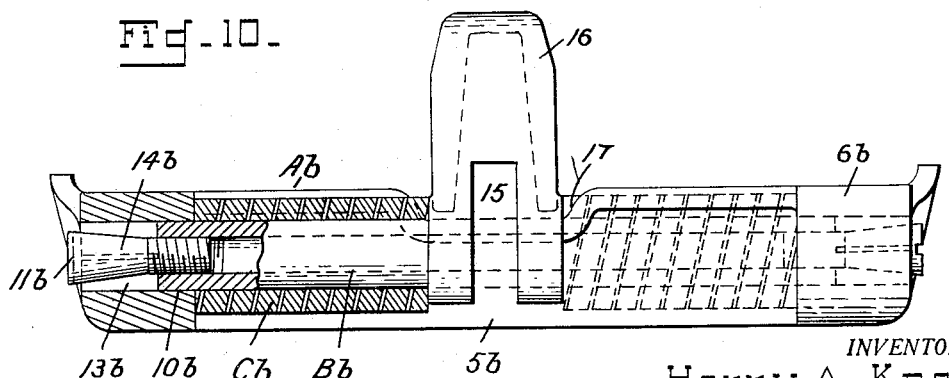

Patented May 1, 1934

1,956,580

UNITED STATES PATENT OFFICE 1,956,580

FLEXIBLE TRACK

Harry A. Knox, Davenport, Iowa

Application September 3, 1931, Serial No. 560,931

4 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a track for track-laying vehicles.

The principal object of the present invention is to provide a light flexible track whose component parts may be readily replaced. The track sections are coupled in a novel manner by means of spiral links hung on specially mounted pins and the arrangement affords considerable lateral flexibility.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a plan view of a portion of the lower flight of an endless track constructed in accordance with the invention.

Figs. 2 and 3 are sectional views on the respective lines of Fig. 1.

Fig. 4 is a detail view in end elevation of the spiral link.

Fig. 5 is a view similar to Fig. 1 showing the application of the invention to a narrow track.

Figs. 6 and 7 are sectional views on the respective lines of Fig. 5.

Fig. 8 is a view similar to Fig. 1 of a further modification of the invention and Figs. 9 and 10 are sectional views on the respective lines of Fig. 8.

Referring to Figs. 1 to 4 the track comprises a series of articulated sections, all identical and each consisting of a shoe A carrying a pair of transverse link pins B on which are hung spiral links C.

The shoe is in the form of a narrow plate 5 disposed transversely relative to the track and carrying spaced, laterally extending arms or bearing blocks 6—6 extending longitudinally of the track. As clearly shown in Fig. 3 a pair of bearing blocks are provided for each one of a set of twin wheels 7—7 and the corresponding inner edge of the plate 5 is formed into a cleat 8 to prevent slipping of the wheels. The extremities of the plate are turned at substantially right angles to the plate to establish guides 9 whereby the endless track is prevented from leaving the wheels.

The bearing blocks 6 are each provided with a transversely directed aperture 10. The aligned apertures of all the bearing blocks on a shoe receive the hollow link pin B which is spaced from the plate 5 and is retained in place by means of end plugs 11 threadedly secured thereto. The extremities of the pins are internally tapered as at 12 and the tapered portion is provided with slots 13 so that a tapered head 14 on the plug 11 acting as a wedge may expand the pin into engagement with the bearing block and thereby securely fix it in place.

The track shoes are connected together by means of the spiral links C which are mounted on the adjacent pins B of adjoining shoes and are laterally confined by the bearing blocks. The links are in effect heavy springs acting transversely of the track to provide lateral flexibility for the individual shoes. When the track is assembled there is a substantial clearance between the end faces of the bearing blocks and between the links and the plate 5. This not only permits relative angular movement of the shoes without interference but also enables a longitudinal adjustment to occur in shortening the track without buckling by virtue of the ability of the pins B to move relative to the closed ends of the links C. The links C also provide a rail for the wheels 7.

In Figs. 5 to 7 the invention is illustrated in connection with a track having a width to accommodate a single wheel. The construction and arrangement are the same and the parts are designated by the same numerals having the suffix $a$.

In the modification shown in Figs. 8 to 10 the corresponding parts are designated by the same numerals having the suffix $b$. In this track only one inside or intermediate bearing block 15 is employed and instead of being integral with the plate 5$b$, it is a separate piece straddling the plate and held in place by virtue of its connection with the pins B$b$ anchored in the outside bearing blocks 6$b$. The block 15 includes a combined driving lug and guide 16 and preferably is seated in a depression 17 in the plate 5$b$ in order to place the point of application of thrust closer to the axis of the link pins.

The operation of removing and replacing any part involves only the withdrawal of the pins B.

I claim:

1. In a track for track-laying vehicles, a series of spaced shoes, bearing blocks on opposite sides of each shoe and each extending longitudinally of the track, the blocks on the same side being spaced and having aligned apertures, a pin in the aligned apertures, and a spiral link having its spirals enclosing adjacent pins of adjacent shoes and confined laterally of the track by the bearing blocks.

2. In a track for track-laying vehicles, a series of spaced shoes, bearing blocks on opposite sides of each shoe and each extending longitudinally of the track, the blocks on the same side being spaced and having aligned apertures, a pin in the aligned apertures, and a spiral link having its spirals enclosing adjacent pins of adjacent shoes.

3. In a track for track-laying vehicles, a series of spaced shoes each having a main body portion, a pair of pins carried by each shoe, said pins disposed transversely of the track and each having a portion spaced from the main body portion of the shoe, and a spiral link having its spirals enclosing the spaced portions of adjacent pins of adjacent shoes, said spirals having a thickness less than a dimension of the space between the pins and the main body portion of the shoe whereby the link is displaceable relative to the shoe.

4. In a track for track-laying vehicles, a series of spaced shoes each having a main body portion, a pair of pins carried by each shoe, said pins disposed transversely of the track and each having a portion spaced from the main body portion of the shoe, and a spiral link having its spirals enclosing the spaced portions of adjacent pins of adjacent shoes.

HARRY A. KNOX.